(12) United States Patent
Kollé

(10) Patent No.: US 6,347,675 B1
(45) Date of Patent: Feb. 19, 2002

(54) COILED TUBING DRILLING WITH SUPERCRITICAL CARBON DIOXIDE

(75) Inventor: Jack J. Kollé, Seattle, WA (US)

(73) Assignee: Tempress Technologies, Inc., Kent, WA (US)

(*) Notice: Subject to any disclaimer, the term of this patent is extended or adjusted under 35 U.S.C. 154(b) by 0 days.

(21) Appl. No.: 09/521,787

(22) Filed: Mar. 9, 2000

Related U.S. Application Data (60) Provisional application No. 60/124,496, filed on Mar. 15, 1999.

(51) Int. Cl.$^7$ ............................................. C09K 7/08
(52) U.S. Cl. ........................ 175/69; 175/71; 175/205; 175/206
(58) Field of Search .................. 175/65–69, 71, 175/205, 206, 212, 117; 166/401, 402; 507/102

(56) References Cited

U.S. PATENT DOCUMENTS

| | | | | |
|---|---|---|---|---|
| 3,650,337 A | * | 3/1972 | Andrews et al. | 175/17 |
| 4,161,222 A | * | 7/1979 | Pye | 175/66 |
| 4,440,242 A | | 4/1984 | Schmidt et al. | 175/107 |
| 4,483,888 A | | 11/1984 | Wu | 427/336 |
| 4,534,427 A | | 8/1985 | Wang et al. | 175/67 |
| 4,553,611 A | * | 11/1985 | Lyons | 175/71 |
| 4,871,037 A | | 10/1989 | Warren et al. | 175/67 |
| 5,413,184 A | | 5/1995 | Landers | 175/62 |
| 5,890,549 A | * | 4/1999 | Sprehe | 175/71 |
| 5,944,123 A | | 8/1999 | Johnson | 175/73 |

* cited by examiner

*Primary Examiner*—David Bagnell
*Assistant Examiner*—Zakiya Walker
(74) *Attorney, Agent, or Firm*—Ronald M. Anderson (57) ABSTRACT

A method for increasing the efficiency of drilling operations by using a drilling fluid material that exists as supercritical fluid or a dense gas at temperature and pressure conditions existing at a drill site. The material can be used to reduce mechanical drilling forces, to remove cuttings, or to jet erode a substrate. In one embodiment, carbon dioxide ($CO_2$) is used as the material for drilling within wells in the earth, where the normal temperature and pressure conditions cause $CO_2$ to exist as a supercritical fluid. Supercritical carbon dioxide ($SC$—$CO_2$) is preferably used with coiled tube (CT) drilling equipment. The very low viscosity $SC$—$CO_2$ provides efficient cooling of the drill head, and efficient cuttings removal. Further, the diffusivity of $SC$—$CO_2$ within the pores of petroleum formations is significantly higher than that of water, making jet erosion using $SC$—$CO_2$ much more effective than water jet erosion. $SC$—$CO_2$ jets can be used to assist mechanical drilling, for erosion drilling, or for scale removal. A choke manifold at the well head or mud cap drilling equipment can be used to control the pressure within the borehole, to ensure that the temperature and pressure conditions necessary for $CO_2$ to exist as either a supercritical fluid or a dense gas occur at the drill site. Spent $CO_2$ can be vented to the atmosphere, collected for reuse, or directed into the formation to aid in the recovery of petroleum.

67 Claims, 6 Drawing Sheets

COILED TUBING DRILLING WITH SUPERCRITICAL CARBON DIOXIDE

RELATED APPLICATIONS

This application is based on prior copending U.S. provisional patent application, Ser. No. 60/124,496, filed Mar., 15, 1999, the benefit of the filing date of which is hereby claimed under 35 U.S.C. §119(e).

GOVERNMENT RIGHTS

This invention was made under contract with the United States Department of Energy, under Contract Number DE-FG03-98ER82696, and the United States government may have certain rights in the invention.

FIELD OF THE INVENTION

The present invention is generally directed to a method and apparatus for drilling, and more specifically, to a method and apparatus for drilling that uses supercritical carbon dioxide ($SC-CO_2$) as a drilling fluid.

BACKGROUND OF THE INVENTION

After an oil or gas well has been successfully drilled and completed, it is necessary over the productive lifetime of the well to perform maintenance within the well borehole. This maintenance often includes de-scaling operations, or reworking operations to increase production in older wells. It is quite advantageous to be able to insert equipment into a borehole to perform such maintenance without removing the surface production equipment at the well head. Coiled tubing (CT) has been employed in the past for carrying out maintenance procedures that do not require drilling and can be inserted into borehole through the surface production equipment without removing the equipment.

More recently, CT has been used in conjunction with downhole motors for drilling operations as well as other types of maintenance. Approximately 600 wells were drilled with CT rigs in 1997. In particular, CT drilling has become an accepted practice for creating lateral extensions from existing oil and gas wells, which are useful for increasing production levels in the wells.

While CT drilling equipment can be introduced into a borehole through existing surface production equipment and eliminates the labor and time consuming steps of assembling and disassembling a traditional multi-jointed drillstring, CT drilling has a limited ability to penetrate rock formations. This limitation exists because CT drillstrings have significantly lower thrust and torque capacities than do traditional jointed drillstrings.

The lower thrust is a result of limitations on the weight available to a CT drillstring. A CT drillstring has a maximum weight capacity that is a function of the steel from which conventional CT is fabricated. Increasing the diameter of a CT can yield an increased weight capacity; however, the diameter can be increased only up to the point at which the tube is so large as to be difficult to coil, or so large as to be unable to pass through the surface equipment at the well head. The torque capacity of a CT drillstring is also limited by the tubing diameter.

These thrust and torque limitations consequently limit the rate of penetration of bits at the end of CT drillstrings. It is known that the torque and thrust required for drilling under specific conditions can be greatly reduced by providing high pressure fluid jets at the drill head. Unfortunately, the useful service life of conventional steel CT is inversely proportional to the operating pressure. Conventional CT drilling operations are carried out at operating pressures of under 35 MPa (5,000 psi), to assure the service life of the equipment is sufficient to justify the equipment's initial capital expense. Such pressures are not sufficient for water jet erosion of rock, which typically requires pressures of at least 15,000 psi. While CT drilling systems can be used with pressures up to 15,000 psi, operation of a CT drillstring at such pressures drastically reduces the service life of the CT drillstring, making operations under such pressure conditions impractical. Alternative CT materials such as titanium and composite may be used to increase pressure capacity, but these materials are considerably more expensive and are not in common use.

Nevertheless, several CT-based drilling systems have been described in the prior art. Despite the relatively poor penetration rate available with CT drillstrings, the advantages noted above weigh heavily in favor of using such equipment.

A CT system useful for drilling a lateral drainage well from within an encased borehole is described in U.S. Pat. No. 5,413,184. A ball cutter is coupled to the tubing and lowered into the borehole. The ball cutter cuts through the borehole casing, and a short distance into the strata beyond the casing. The ball cutter and tubing are wound back to the surface, and the ball cutter is replaced with a nozzle blaster. The nozzle blaster is lowered into the borehole and moved into the opening created by the ball cutter. Fluid is then pumped through the nozzle blaster to cut through the stratum. As noted above, the range of pressures available with the use of CT drillstrings do not provide a generally satisfactory penetration rate for such equipment.

Another CT-based system used to drill a lateral drainage well from within an encased borehole is described in U.S. Pat. No. 5,944,123. A rotatable drill head including at least one fluid port is coupled to a distal end of the tubing, which is lowered into the borehole. The rotatable drill head includes at least one contact member that is adapted to maintain a constant distance between the drill head and the substrate face. Modulation of the rotation of the drill head enables drilling of an off-axis channel, which enables the resulting borehole to have a radius of curvature much smaller than can be achieved with traditional drillstrings. Again, the range of pressures available with the use of CT drillstrings does not provide a generally satisfactory penetration rate, even though a borehole with a desirable radius of curvature can be obtained.

It would therefore be desirable to provide a method by which the penetration rate of CT drillstrings can be increased, thus enabling the benefits of CT drilling operations to be realized without sacrificing performance with respect to the penetration rate of the drill head. It would further be desirable to provide a system that implements this method. The prior art does not disclose or suggest such a method or apparatus.

SUMMARY OF THE INVENTION

In accord with the present invention, a method is defined for using either a supercritical fluid or a dense gas to increase an efficiency of a drilling operation performed with a drilling apparatus in a substrate. The method includes the step of providing a material that exists in either a supercritical phase state or a dense gas phase state at the temperature and pressure present in the substrate where the drilling operation occurs. A fluid stream of the material is ejected within a well, and at least a portion of the material in the fluid stream exists in either the supercritical phase state or the dense gas phase state, increasing the efficiency of the drilling operation by providing cooling to the drilling apparatus, removing debris generated by the drilling operation, and/or eroding the substrate.

In one embodiment, the drilling apparatus includes a member adapted to apply at least one of a mechanical cutting action, a mechanical grinding action, and a mechanical shearing action to the substrate. The member is positioned in contact with the substrate.

In another embodiment, a fluid jet is included in the drilling apparatus, which is positioned adjacent to the substrate, such that the fluid jet is directed toward the substrate.

The pressure is preferably controlled at the drilling site to ensure that at least the portion of the material exists in either the supercritical phase state or the dense gas phase state at the drilling site. The material includes either carbon dioxide, methane, natural gas, or a mixture of those materials. The drilling operation includes removing scale deposits from a surface of the substrate, forming an opening in the substrate, or enlarging an opening in the substrate.

When the substrate includes a plurality of pores, the material is caused to penetrate into the pores, which may be formed in a material such as rock or concrete. In one application, the substrate is a well, and the material is used for recovering petroleum, natural gas, or other resources from a geological formation. The drill apparatus then preferably includes a coiled tube adapted to fit within the well. The coiled tube preferably includes a downhole motor and a drill head driven by the downhole motor. The downhole motor can be a turbine motor, a jet rotor, a progressive cavity displacement motor, or a vane motor. The drill head can be a jet erosion bit, a mechanical bit, or a jet assisted mechanical bit.

In one form of the present invention, the downhole motor is energized by causing the material to flow through the coiled tube and the downhole motor. In another form of the invention, a second fluid is provided, and the downhole motor is energized by causing the second material to flow through the coiled tube and the downhole motor.

The pressure at the drill site can be controlled to ensure the material exists as a supercritical fluid or dense gas at the drill site. For example, if the existing well includes a surface choke manifold, the surface choke manifold can be used to control the pressure at the drill site. Alternately or in combination with the surface choke manifold, the well can be capped with drilling mud to control the pressure at the drill site. Preferably, the pressure is caused to exceed 5 MPa, and even more preferably, to exceed 7.4 MPa, when the material is carbon dioxide.

A recovery vessel can be used to collect and recover the material after it has been used to increase the efficiency of the drilling operation, so that the material can be reused.

Another aspect of the present invention is directed to apparatus for using either a supercritical fluid or dense gases in drilling operations. The apparatus includes elements that carry out functions generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF A PREFERRED EMBODIMENT

Overview of the Present Invention

The present invention employs supercritical fluids or dense gases in a drilling operation. The unique properties of supercritical fluids and dense gases offer advantages that have not been applied heretofore in drilling boreholes and in other applications. A supercritical fluid is defined as any substance that is above its critical temperature (Tc), and critical pressure (Pc). Supercritical fluids are produced by heating a gas above its Tc, while compressing the gas above its Pc; or by compressing a liquid above its Pc, while heating the liquid above its Tc. The critical temperature is therefore the highest temperature at which a gas can be converted to a liquid by an increase in pressure. Similarly, the critical pressure is the highest pressure at which a liquid can be converted to a traditional gas by an increase in the liquid temperature. In the so-called critical region, there is only one phase of a substance, and the substance possesses properties of both a gas and a liquid. Under these conditions, the molar volume of the substance is the same whether its original form was a liquid or a gas. A supercritical fluid exhibits physical-chemical properties intermediate between those of liquids and gases. Mass transfer is rapid with supercritical fluids. Their dynamic viscosities are nearer to those in normal gaseous states. The diffusion coefficient is (in the vicinity of the critical point) more than ten times that of a liquid.

In the following description and the claims that follow, it will be understood that the term "supercritical fluid" means a substance that is above its critical temperature (Tc) and critical pressure (Pc), and thus exhibits properties intermediate between those of liquids and gases. The term "dense gas," as used herein, should be understood to mean a gas whose pressure is within 25% of the Pc for that gas and whose temperature is above the critical temperature Tc. Thus, an increase of up to 25% in the pressure of a dense gas will result in a supercritical fluid. Such a dense gas does not exhibit liquid-like properties to the extent that a supercritical fluid does, but dense gases do exhibit liquid-like properties to a useful extent. The term "drilling operation," as used herein and in the claims that follow, broadly means an operation in which a portion of a substrate is removed. That portion can represent a surface formation, such as scale deposits or high points on a surface, or the portion of the substrate that is removed can form a cavity in the substrate, such as is the case when a hole is drilled in a substrate.

It has been determined that the properties of supercritical fluids and dense gases can be beneficially applied to drilling operations in a number of ways. Supercritical fluids or dense gases can be used as cutting fluids. The viscosity characteristics of supercritical fluids and dense gases can be exploited to reduce the load required to cut rock or rock-like materials, and to facilitate the removal of cuttings from a drill site. If the substrate is porous, jet erosion can occur adjacent to a drill head at lower fluid jet pressures than would be required if liquids such as water or fuel oil were employed. Jet erosion can be used alone to perform the drilling operation, or to assist a mechanical drilling operation.

Because supercritical fluids and dense gases have specific temperature and pressure requirements, the use of these materials in conjunction with a drilling operation requires careful control of temperature and pressure conditions. While control of temperature and pressure conditions can be readily achieved using temperature controls and pressure vessels, it is preferable if temperature and pressure conditions normally existing at the location of the drilling operation support the use of a supercritical fluid or dense gas with little modification of existing temperature and pressure conditions.

The following disclosure of a preferred embodiment of the present invention is applied to particular types of drilling operations regularly conducted in association with extracting petroleum resources from a geological formation. However, it is not intended that the invention be limited to this application, since it can clearly be applied to other types of drilling operations, and is not limited to drilling operations related to geological formations. By the use of appropriate temperature and pressure controls, supercritical fluids and dense gases can be beneficially employed in conjunction with many other types of drilling operations.

Details of a Preferred Embodiment

The pressure and temperature conditions associated with drilling operations related to extracting natural gas, petroleum and geothermal resources from within geologic formations are such that several readily available materials can be introduced into a drilling operation as supercritical fluids or dense gases, without requiring complicated systems to control the temperature and pressure at the site of the drilling operation. In particular, carbon dioxide ($CO_2$) can be readily introduced as a supercritical fluid or a dense gas into drilling operations associated with such geologic formations. It should be noted that while $CO_2$ is a particularly useful material, the present invention is not limited to only the use of $CO_2$ as the supercritical fluid or dense gas at the drill site.

Figure 1:
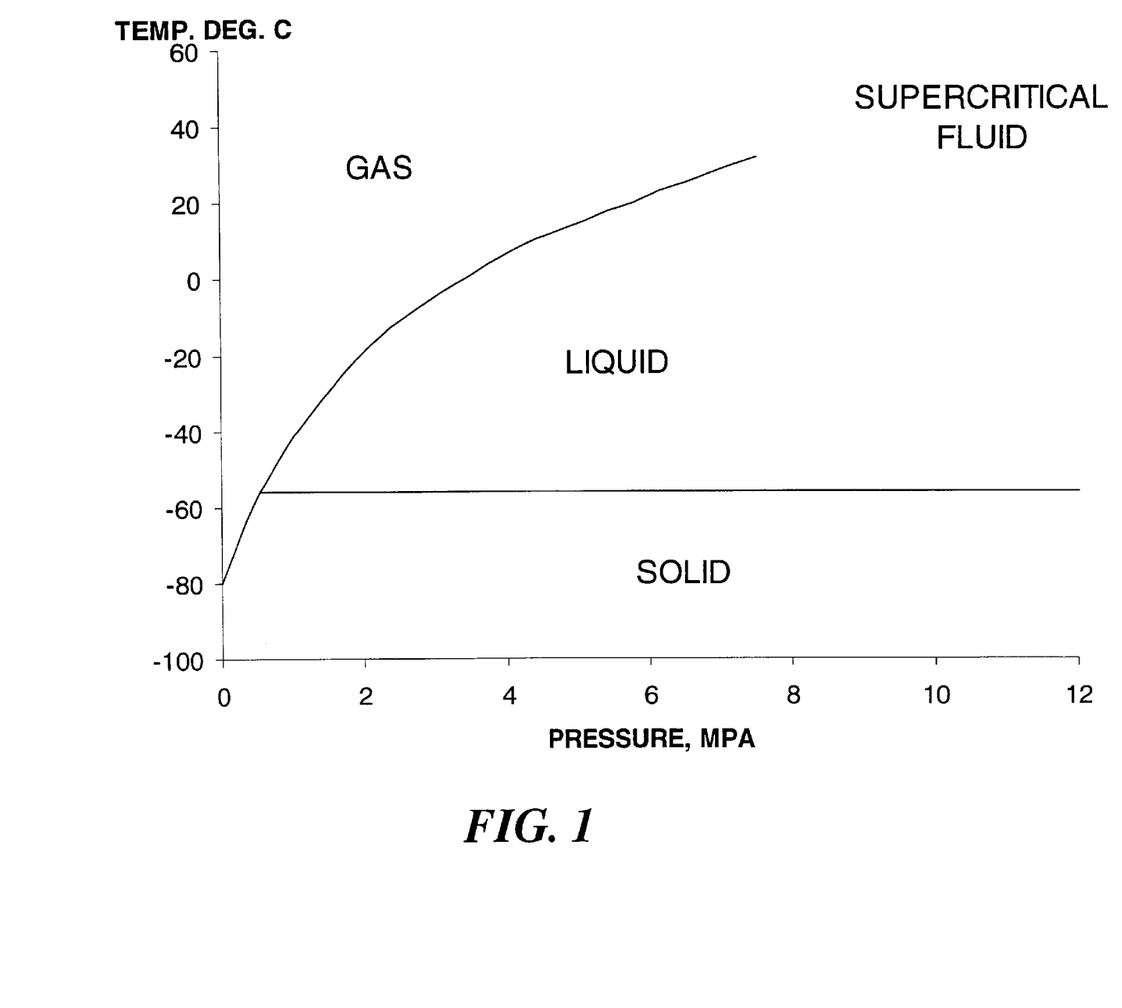
FIG. 1 is a phase diagram graph for carbon dioxide ($CO_2$)

It is well known that the temperature of geological formations increases continuously with depth in the earth. The earth's temperature gradient is typically between 20 and 50 degrees centigrade per kilometer of depth. At depths below a few hundred meters, the temperature of the earth is thus almost always greater than 31 degrees centigrade—the critical temperature of carbon dioxide. While $CO_2$ is a gas at pressures and temperatures normally found on the earth's surface (though $CO_2$ can readily be compressed to form a liquid), under typical borehole conditions, $CO_2$ exists as a supercritical fluid in the borehole near the bit. Under these conditions, the SC—$CO_2$ is stable and effective for cooling drilling equipment, removing cuttings, and eroding rock. The phase diagram for $CO_2$ is shown in FIG. 1. At a temperature of 31° C. and pressure of 7.4 MPa (about 1071 psi), $CO_2$ becomes a supercritical fluid. The viscosity of $CO_2$ at the critical point is only 0.02 centipoise, increasing with pressure to about 0.1 centipoise at 70 MPa (about 10,000 psi).

Liquid $CO_2$ is a dense fluid that is readily available and relatively easy to handle. At temperatures below 31° C. (300° K), and pressures greater than 50 MPa, the density of liquid $CO_2$ is comparable to that of water. This fluid can be pumped using plunger pumps with relatively high efficiency, and can be used to drive a downhole rotation motor (such as a turbine) or positive displacement hydraulic motor. Once inside a geological formation, the temperature and pressure conditions within the borehole will cause liquid $CO_2$ to undergo a phase transformation into a supercritical fluid or a dense gas. This fluid can be used to drive a turbine or positive displacement hydraulic motor so long as the density of the fluid is high. Thus, liquid $CO_2$ can easily be used as a replacement for water or water-based drilling fluids in drilling operations associated with petroleum resources. It is significant to note that liquid $CO_2$ and SC—$CO_2$ are compatible with standard drilling equipment with minor modifications to seals and plunger housings, and that specialized drillstrings, pumps, downhole motors and drill heads are not required.

When using SC—$CO_2$ for drilling operations, the fluid will expand to the ambient bottom hole pressure. If the ambient bottom hole pressure is kept close to or above the critical pressure (and such conditions are readily achievable using conventional drilling techniques) the $CO_2$ will not flash to vapor, but will form a dense jet. Experiments have demonstrated that rock drilling in a SC—$CO_2$-filled borehole is much more efficient than drilling with water-based fluids. Similarly, jet erosion with SC—$C0_2$ jets is much more effective than jet erosion with water jets.

Figure 2:
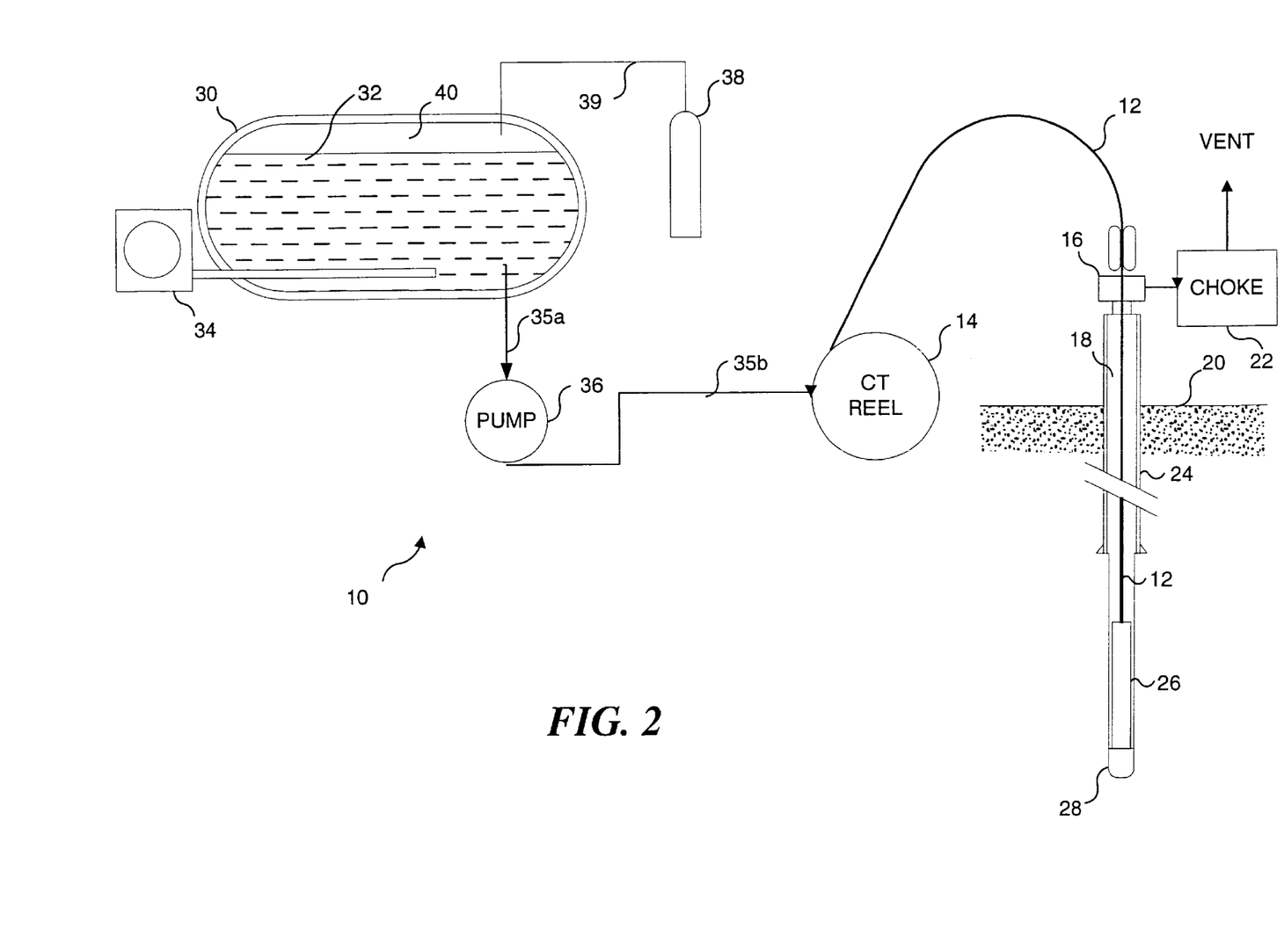
FIG. 2 is a schematic view of SC—$CO_2$ being used in conjunction with a coiled tube drilling operation.

In a first embodiment of the present invention, liquid $CO_2$ is used in conjunction with a CT drillstring. FIG. 2 illustrates such a SC—$CO_2$ CT drilling system 10. In this system, liquid $CO_2$ 32 is used instead of water-based drilling fluids, or other types of drilling fluids. Liquid $CO_2$ 32 is provided from a $CO_2$ supply 30. Preferably, $CO_2$ supply 30 is a refrigerated bulk container. A chiller 34 is used to maintain the temperature of liquid $CO_2$ 32 to within a range of −20° C. to 0° C. Unlike many other liquefied gases, such as nitrogen, liquid $CO_2$ is not characterized by extremely low, or cryogenic temperatures. Thus, the pumps and fluid lines used for handling liquid $CO_2$ do not need to be able to withstand extremely cold temperatures.

Typically, a liquid $Co_2$ supply is stored under pressures ranging from 2 to 4 MPa. Preferably, $CO_2$ supply 30 is pressurized with a nitrogen gas blanket 40 to keep liquid $CO_2$ 32 from vaporizing during transfer to a pump 36. The nitrogen is provided by a nitrogen supply 38, connected to supply 30 via a fluid line 39. The use of a nitrogen blanket in conjunction with the pumping of liquid $CO_2$ is well known. Other gases such as air or $CO_2$ can be used instead of nitrogen. If a gas blanket is not used, a super cooler can be used between liquid $CO_2$ supply 30 and pump 36, to ensure that the liquid $CO_2$ does not vaporize, or flash, in the suction side of the pump causing a vapor-lock condition. The flashing refers to the liquid $CO_2$ changing to a gas. When this change of state occurs at the pump, a vapor lock may develop that can disrupt the pumping process. The use of a supercooler, rather than a nitrogen blanket, is less preferable, as it adds complexity to the system. Furthermore, supercooled liquid $CO_2$, while not yet at cryogenic temperatures, does reduce the temperature at which the pumps and fluid transfer lines need to operate, which may increase failure rates. Thus, the use of a nitrogen or air blanket is preferred.

Refrigerated $CO_2$ liquid 30 is fed to pump 36 through an insulated fluid line 35a. Preferably pump 36 is a plunger type positive displacement pump that pressurizes the liquid $CO_2$ to 10 to 20 MPa for mechanical drilling; or to pressures as high as 100 MPa for jet erosion drilling, or for jet erosion of carbonate scale. Once the liquid $CO_2$ leaves pump 36, it enters an insulated line 35b, which leads to a coiled tube 12 at a CT reel 14. It should be noted that while supercritical fluid drilling can be used in conjunction with more traditional multi-jointed drillstrings, CT drillstrings are particularly well suited to SC—$CO_2$ drilling. In multi-joint drillstrings, pressure conditions within the drillstring change every time a joint is added to the drillstring. Liquid $CO_2$ within the drillstring might flash to gas and be lost. While new liquid $CO_2$ could be added to the drillstring after a joint is sealed, the process would not use liquid $CO_2$ very efficiently. Because CT drillstrings are continuous, $CO_2$ is not lost as a drillstring is inserted into a formation.

Coiled tube 12 is advanced to the drilling site by inserting coiled tube 12 through a well head 16 into a cased borehole 18. As the liquid $CO_2$ passes through coiled tube 12 and into borehole 18, its temperature will increase to the local ambient temperature. Since borehole temperatures are typically greater than 31° C., the $CO_2$ will be in the supercritical state as it reaches the drill head or other downhole tools. The SC—$CO_2$ can be used to drive a downhole rotation motor 26, such as a positive displacement type downhole motor, a turbine type motor, a jet rotor, or a rotary-percussive hammer. Downhole motor 26 is used to energize a drill head 28. Drill head 28 preferably uses a jet erosion bit, a jet assisted mechanical bit, or a conventional mechanical bit for rotary or rotary/percussive drilling.

The SC—$CO_2$ is compressible and will expand through nozzles (see FIGS. 5–7) on drill head 28 to the ambient borehole pressure. In a preferred embodiment of this invention, the pressure at the drilling site (generally the hole bottom) is maintained as close as possible to the critical pressure of 7.4 MPa, in order to maintain the $CO_2$ in the borehole in the dense gas or supercritical state. The drilling advantages achieved by the use of $CO_2$ are greatest when the pressure at the drilling site is equal to the critical pressure; however, substantial drilling advantages are obtained when the $CO_2$ is in the dense gas phase, or anywhere in the supercritical region at a temperature greater than 31° C. or a pressure greater than 7.4 MPa.

Once the $CO_2$ is ejected from drill head 28 and has enhanced the drilling operation, the spent $CO_2$ will ascend up borehole 18 to the surface and be vented to the atmosphere through a choke manifold 22. As the $CO_2$ ascends, it will transport the drill cuttings to the surface as well. At the drilling site, where the $CO_2$ is in a supercritical state (or a dense gas state), the viscosity of the $CO_2$ is quite low, while its density is high. Consequently, the $CO_2$ is quite turbulent and very effective at removing cuttings from the drill site and from horizontal or highly inclined holes. As the $CO_2$ ascends to the surface, and changes in state from a supercritical fluid or dense gas, the $CO_2$'s ability to transport cuttings diminishes somewhat as the density of the fluid diminishes. However, when expanding from a dense gas or supercritical fluid, the velocity of the $CO_2$ increases. Accordingly, the fluid's ability to transport cuttings remains relatively good and is increased if the diameter of borehole 18 is small, as is the case if borehole 18 is a production pipe within a larger well. It should be noted that $CO_2$ is compatible with other types of drilling fluids, and it is envisioned that water or synthetic based drilling muds could be used in conjunction with $CO_2$. It is also noted that, if a small amount of water containing foaming agents is injected along with the $CO_2$, a foam will result when the $CO_2$ expands into a gas. This foam will assist in carrying cuttings from the upper, vertical portions of the hole.

It is possible to control borehole pressure, to ensure that the $CO_2$ is a supercritical fluid or a dense gas at the drill site, by controlling the pressure of the $CO_2$ at the well head. The upper portion of a borehole is lined with a steel casing 24 in order to prevent the escape of drilling fluids and production oil or gas. Casing 24 is capped with a well head 16 to control pressure. Well head 16 is equipped with a port (not separately shown) that allows coiled tube 12 to be introduced into borehole 18 while the well remains pressurized. Borehole 18 pressure may be maintained by restricting the flow of drilling fluid from the well through choke manifold 22 located on well head 16 at the surface. In SC—$CO_2$ CT drilling system 10 illustrated in FIG. 2, the system is an open loop system, and excess $CO_2$ is vented to the atmosphere through choke manifold 22.

In a preferred embodiment of this invention, choke manifold 22 includes a plurality of individual choke valves (not separately shown) so that continuous drilling operations are enabled even if one of the choke valves is being serviced. As the spent $CO_2$ ascends up borehole 18 from the drilling site, its pressure and temperature may fall below the critical point. At this point, the $CO_2$ is a mix of vapor and liquid. A pressure gauge (not separately shown) located on the well head can be used in conjunction with downhole temperature data to calculate the pressure in borehole 18 using equation-of-state data for the density of $CO_2$. Those of ordinary skill in the art will readily understand the use of equations-of-state to calculate the density of the $CO_2$ and consequently its pressure within the borehole. Alternatively, a pressure gauge (not separately shown) may be deployed near drill head 28 to enable direct monitoring of downhole pressures without resort to equation-of-state density calculations. The sensor for such a pressure gauge would be connected to a readout or display on the surface through a cable that is disposed inside coiled tube 12. Such pressure monitoring techniques are well known in the art.

Figure 3:
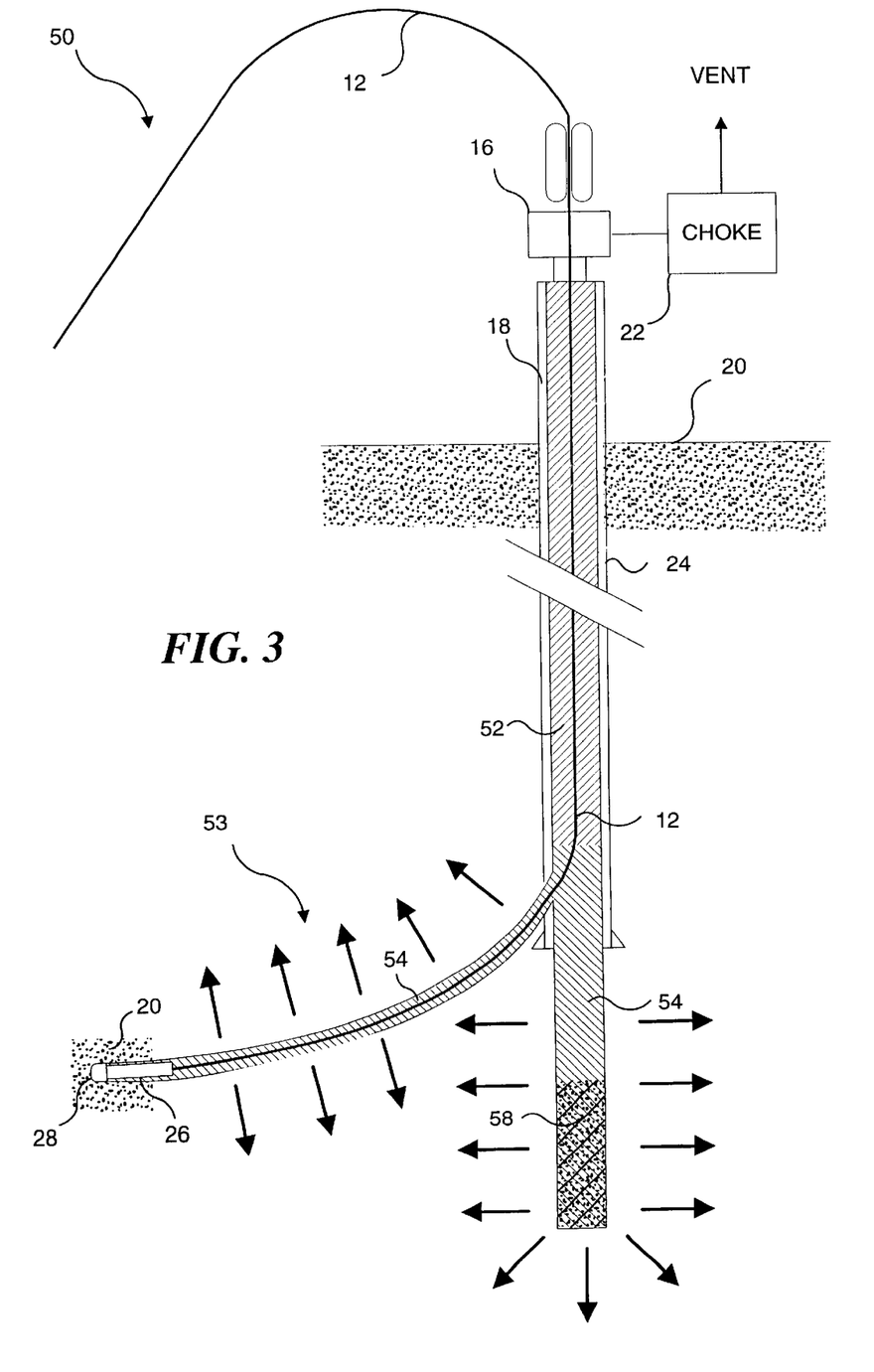
FIG. 3 is a schematic view of using mud cap drilling to control a pressure within a borehole to drive SC—$CO_2$ into a petroleum formation to increase production.

Another method of controlling borehole pressure to ensure that the $CO_2$ exists in a supercritical or dense gas state at the drilling site is illustrated in FIG. 3, in which a SC—$CO_2$ mudcap drilling system 50 is shown. In this embodiment, $CO_2$ drilling occurs with a mudcap 52. Mudcap drilling is commonly employed under conditions when borehole 18 can accept the drilling fluid and drill cuttings. Some bores holes or formations can be damaged by disposing of drilling fluids or cuttings within the well.

As described with respect to FIG. 2, liquid $CO_2$ is pumped into coiled tube 12, which is advanced to a desired drilling location within borehole 18 via well head 16. Drilling mud, either water-based or synthetic mud, is pumped into borehole 18 to prevent spent $CO_2$ from ascending up the borehole to the surface, which results in two phenomena. First, the pressure within the borehole is increased, generally ensuring that the pressure at the drill site is sufficiently high to enable the liquid $CO_2$ to transform into a supercritical phase state or a dense gas phase state.

The second phenomena relates to the diffusivity of SC—$CO_2$ and the general porosity of geologic formations. Because the diffusivity of SC—$CO_2$ is so high, and the rock associated with petroleum containing formations is generally porous, the SC—$CO_2$ is quite effective in penetrating the formation where casing 24 does not line borehole 18, as is illustrated by the arrows. This penetration is beneficial. $CO_2$ is commonly used to stimulate the production of oil wells, because it tends to dissolve in the oil, reducing the oil viscosity, while providing a pressure gradient that drives the oil from the formation. As illustrated in FIG. 3, the CT drillstring is being used to drill a lateral extension 53, a technique commonly employed to increase the production in an existing well. Because of mudcap 52, SC—$CO_2$ cannot ascend to the surface and vent through choke manifold 22. Instead, SC—$CO_2$ fills a region 54 that includes lateral extension 53 and the balance of borehole 18 below mudcap 52. Because of its extremely low viscosity and high density, SC—$CO_2$ does an excellent job of removing cuttings 58 from the newly drilled lateral extension 53. Mud cap 52 similarly prevents these cuttings from ascending through the surface. Instead, the SC—$CO_2$ carries cuttings 58 out of lateral extension 53 into the main borehole 18, where they settle and drop to the bottom of borehole 18. When mudcap 52 causes the trapped $CO_2$ to pressurize the borehole above the pressure of formation fluids, the $CO_2$ is enabled to enter the formation. The spent $CO_2$ is thus used to energize the oil trapped in the formations, or to drive oil from one lateral extension to another.

Figure 4:
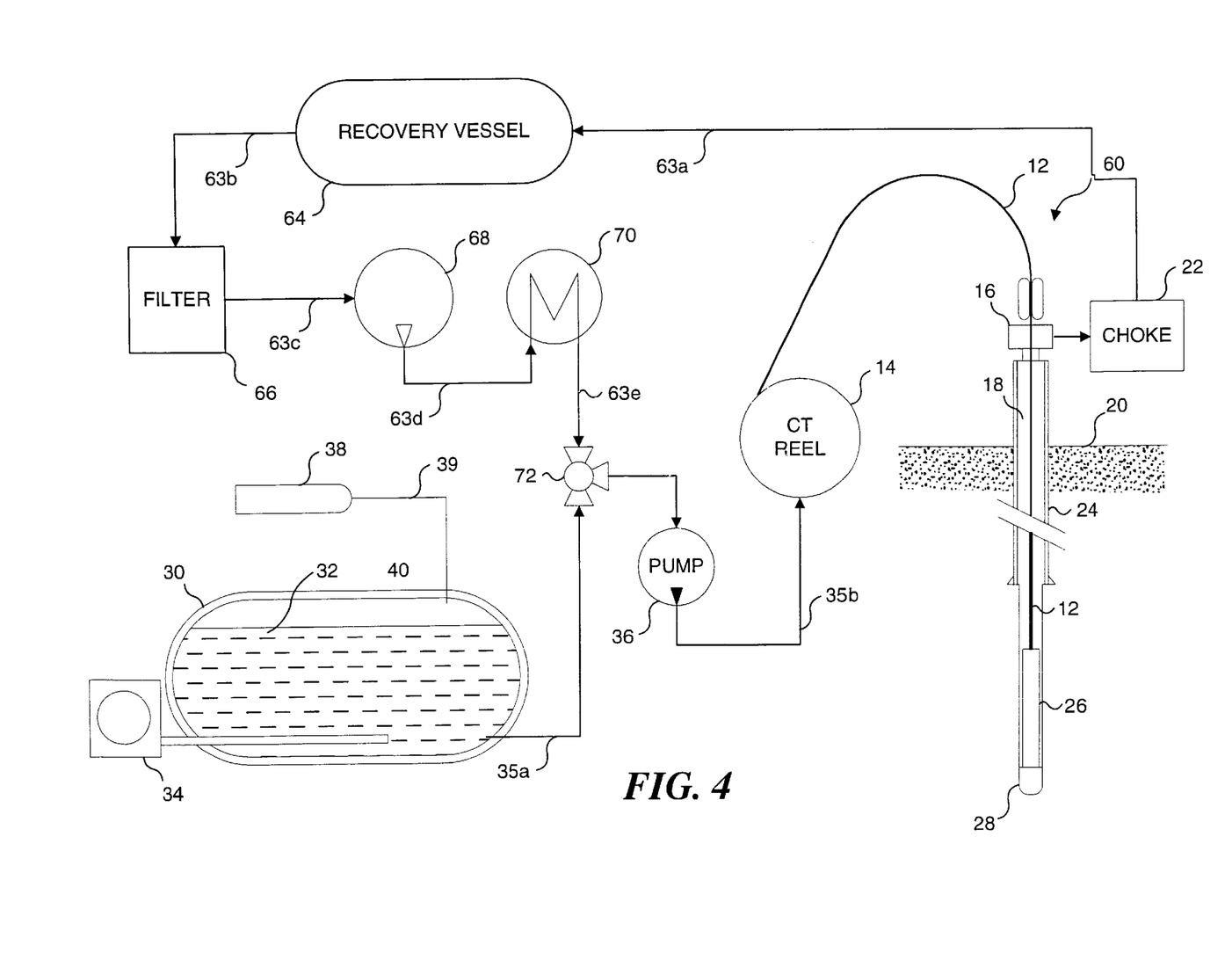
FIG. 4 is a schematic view of a closed loop SC—$CO_2$ drilling method in which spent $CO_2$ is recovered for reuse.

In cases where little benefit is expected from driving $CO_2$ into a formation, or mudcap drilling is not possible or desirable, it can be economically and environmentally beneficial to recover spent $CO_2$ ascending borehole 18, rather than venting the spent $CO_2$ to the atmosphere. Such a closed loop SC—CO2 drilling system 60 is illustrated in FIG. 4. Instead of being vented from choke manifold 22 as in the system illustrated in FIG. 2, spent $CO_2$ passes into a fluid line 63a.

Fluid line 63a transfers the spent $CO_2$, no longer a supercritical fluid but primarily a gas, to a recovery vessel 64. Preferably, recovery vessel 64 operates at 2 to 5 MPa, which is the operating pressure of a typical pressure separator vessel employed in closed-loop underbalanced drilling. The flow into recovery vessel 64 may include water, solids, and $CO_2$ vapor. At an operating pressure of 2 to 5 MPa, the $CO_2$ vaporizes, enabling the free water and solids to separate. The volume of recovery vessel 64 preferably is sufficient to accommodate all of the solids and fluids produced during drilling. Such a recovery vessel is practical when drilling relatively short, small diameter boreholes. If a larger or longer borehole is required, the separator may be equipped with solids removal equipment, such as a pressurized auger. Those of ordinary skill in the art will readily understand how such additional equipment can be incorporated into recovery vessel 64 as illustrated.

Free $CO_2$ gas exits recovery vessel 64 via a fluid line 63b to a filter unit 66. The $CO_2$ is filtered to remove any impurities, and dried to remove water not removed in recovery vessel 64. After exiting filter unit 66, the filtered $CO_2$ gas flows through a fluid line 63c to a compressor 68, which is used to compress the $CO_2$ to around 5 MPa.

Upon exiting compressor 68, the $CO_2$ will likely be in the gas or supercritical state. The compressed $CO_2$ moves through a fluid line 63d to a chiller 70, which is incorporated to transform the $CO_2$ into the liquid state before it is pumped to higher pressures for drilling and jet erosion. The $CO_2$ exits chiller 70 through an insulated fluid line 63e and flows to a valve 72. When the closed loop system is first started, valve 72 is used to direct liquid $CO_2$ from liquid $CO_2$ supply 30 into pump 36, and through coiled tube 12 to the drill site. As spent $CO_2$ is recovered, valve 72 is used to enable recovered $CO_2$ to enter pump 36, while simultaneously reducing the flow of liquid $CO_2$ from supply 30 to pump 36, to a level that makes up for any $CO_2$ lost in the recovery process.

Figure 5:
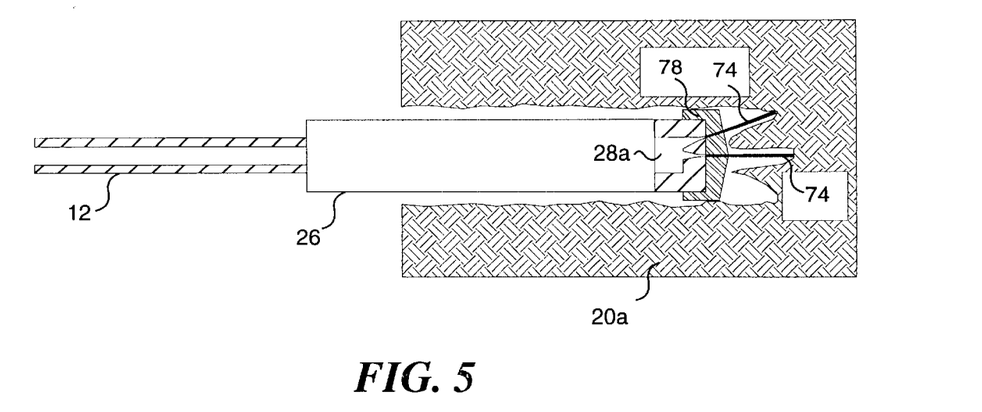
FIG. 5 is a schematic view of using a SC—$CO_2$ fluid jet to assist a mechanical drilling operation.
Figure 6:
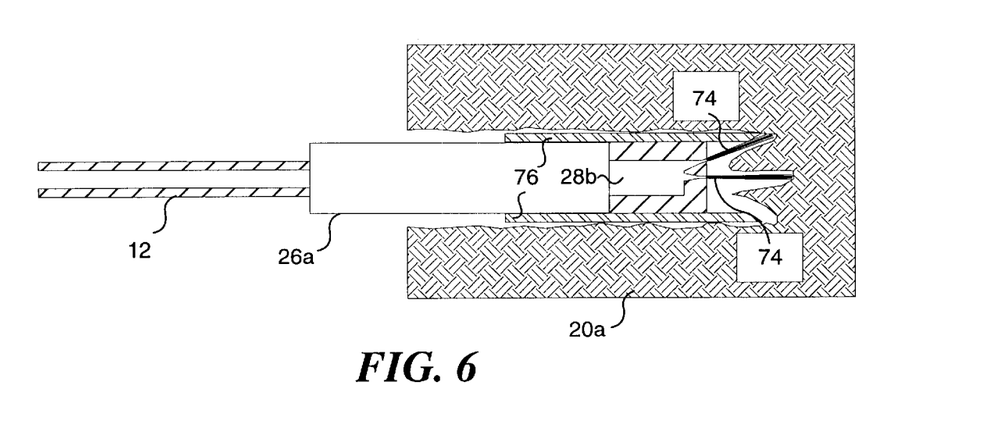
FIG. 6 is a schematic view of using a SC—$CO_2$ fluid jet for erosion drilling.
Figure 7:
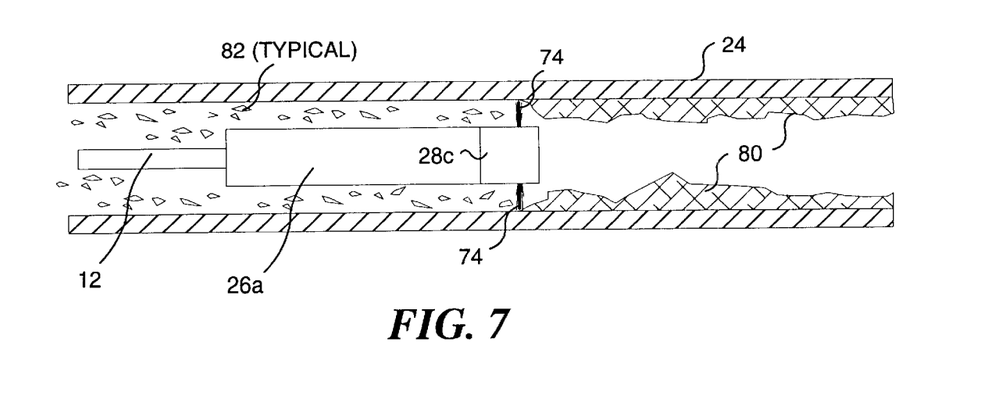
FIG. 7 is a schematic view of using a SC—$CO_2$ fluid jet for de-scaling tubing.
Figure 8:
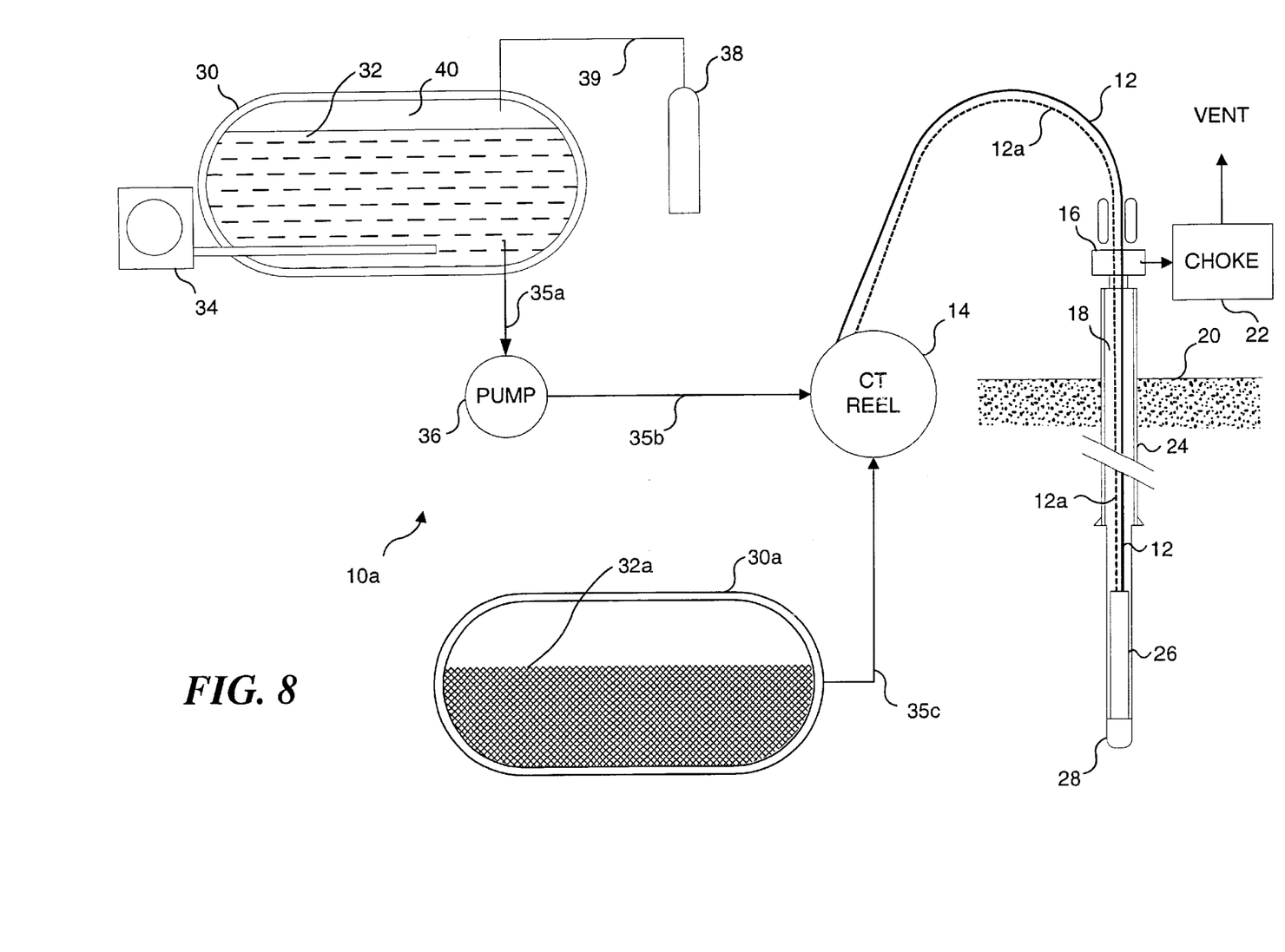
FIG. 8 is a schematic view of SC—$CO_2$ being used in conjunction a second drilling fluid in a coiled tube drilling operation.

As noted above, once at the drill site, the SC—$CO_2$ or dense gas $CO_2$ enhances drilling operations in a number of ways. The very low viscosity/high density fluid provides good transport of cuttings from the drill site, as well as providing good cooling to the drill head. The high diffusivity of SC—$CO_2$ (and to a lesser extent, dense gas $CO_2$), and the general porosity of rock formations normally associated with petroleum deposits enables the $CO_2$ to easily penetrate into the formation. This phenomenon is useful in both erosion drilling and stimulating production by introducing $CO_2$ into the formation (thinning the petroleum, making recovery easier, as well as adding gas into the formation, which further stimulates the production levels by driving more petroleum out of the formation). As the SC—$CO_2$ flows through the CT, its density is sufficient to drive a downhole motor. The downhole motor comprises, for example, a turbine motor, a progressive cavity displacement motor, a hydraulic vane motor, or a rotary percussive hammer. FIGS. 5–7 illustrate three types of powered drill heads that will be useful in SC—$CO_2$ CT drilling operations. While FIGS. 5–7 indicate that the SC—$CO_2$ flows through the CT and energizes the downhole motor employed to rotate the drill heads, it is envisioned that SC—$CO_2$ CT drilling systems could include a dual conduit system, shown in FIG. 8, in which a second drilling fluid 32a, such as water or drill mud, would flow from a separate supply vessel 30a through a fluid line 35c to CT Reel 14. From CT Reel 14, second drilling fluid 32 flows through a separate conduit 12a in the CT to power the downhole motor 26.

FIG. 5 illustrates SC—$CO_2$ flowing through coiled tube 12 being used to improve the performance of a mechanical drill head. As described above, the $CO_2$ will generally be in a liquid state when entering a well, and the pressures and temperatures within the well will cause the $CO_2$ to change to the supercritical phase state. The SC—$CO_2$ will energize downhole motor 26, which rotatingly drives a mechanical drill head 28a. Mechanical drill head 28a can be one of any of the generally available mechanical drill heads normally used in the art. Using SC—$CO_2$, downhole motor 26 can rotate a conventional rotary drill bit 78 at a torque and rotary speed comparable to that achieved when driven by the flow of water or a water-based mud. Such conventional rotary bits include roller cone bits, surface-set or impregnated diamond bits, polycrystalline diamond compact (PDC) bits, and thermally stabilized diamond (TSD) bits. The SC—$CO_2$ could also drive a rotary-percussive hammer equipped with an appropriate bit.

The SC—$CO_2$ would be directed through one or more conventional jet nozzles located on the bit, or through an open flow passage, as on some bit designs. Empirical data has demonstrated that SC—$CO_2$ provides substantially better drilling rates than drilling with water-based muds, because SC-$CO_2$ effectively eliminates differential pressures that commonly cause balling and sticking of mechanical bits in pressurized boreholes.

In a preferred embodiment, a plurality of SC—$CO_2$ fluid jets 74 are directed at the rock face being drilled. In addition to removing cuttings from the drill site and cooling the mechanical bit, fluid jets 74 also weaken the rock, thereby aiding in the drilling process. In this primarily mechanical drilling process, the SC—$CO_2$ will be provided at pressures of up to 20 MPa.

The embodiment shown in FIG. 5 may also employ SC—$CO_2$ jets at pressures of up to 100 MPa. In such an embodiment, fluid jets 74 greatly reduce the thrust and torque required for drilling by removing kerfs of rock and leaving behind thin ridges that are easily broken by drill bit 78. This technique is also well-known in the art of water jet drilling, and the same principles apply when using SC—$CO_2$ as the fluid instead of water.

FIG. 6 illustrates a drill head 28b that employs fluid jet erosion alone for drilling purposes, rather a fluid jet in combination with a mechanical bit. In this embodiment, downhole motor 26a preferably incorporates a high-pressure casing that transmits high-pressure SC—$CO_2$ to the bit for jet erosion drilling. Multiple fluid jets 74 are distributed on drill head 28b in order to cut the entire cross-sectional area of the hole. A non-rotating standoff collar 76 ensures that drill head 28b will not advance until all of the rock ahead of the collar has been removed. While two fluid jets 74 are illustrated, those of ordinary skill in the art will readily understand that additional fluid jets may be used. Preferably one fluid jet will cross over the center of the hole to ensure that no rock remains standing in the center to obstruct the drill. Fluid jets 74 may also be angled and offset from the axis of drill head 28b to generate rotational torque for a jet rotor type downhole motor 26a. These design features are well known in water jet drilling, and the same principles apply to $CO_2$ jet drilling.

While fluid jet drilling using water or drilling mud has been demonstrated in a wide variety of rock types, offering penetration with minimal thrust or torque, the efficiency and speed of the erosion of rock using water jets is very slow, and jet drilling systems have not achieved commercial success. Empirical data obtained using a SC—$CO_2$ fluid jet demonstrates that SC—$CO_2$ provides at least an order of magnitude improvement in the efficiency of jet erosion of hard rock. This is due to the dramatically higher diffusivity that SC—$CO_2$ has in porous materials. The process of fluid jet erosion is greatly enhanced by the diffusion of the jetting fluid into micro cracks and pores in the rock, and because of its much higher diffusivity, SC—$CO_2$ is a far superior jet erosion fluid than water. In this embodiment, the SC—$CO_2$ is pumped through coiled tube 12 at pressures of 20 to 100 MPa. At these pressures, SC—$CO_2$ fluid jets 74 will erode rock and other hard materials.

In addition to using SC—$CO_2$ fluid jets to erode rock, the fluid jets can also be used to remove scale. Carbonate scale forms on the interior of the steel casing with a well, and the buildup of scale reduces the production capacity of the well. Such scale is currently removed from the casing using an abrasive entrained in a 10 to 20 MPa waterjet. Conventional hard abrasives will cut through coiled tubing and steel casing as well as the scale, and cannot be used for this application. Special purpose abrasives designed to cut mineral scale, but not steel tubing have been developed; however, costs and handling issues are significant. Ultra-high-pressure (UHP>100 MPa) water jets are effective at removing hard mineral scale from tubing; however, conventional CT cannot handle the pressures required. FIG. 7 illustrates SC—$CO_2$ being used as an alternative method to remove such scale deposits.

SC—$CO_2$ flows through coiled tube 12 at a pressure ranging from 10 to 100 MPa. The SC—$CO_2$ energizes downhole motor 26a, which drives a drill head 28c. Drill head 28c includes a plurality of fluid outlets that radially direct SC—$CO_2$ fluid jets 74 at scale deposits 80. Preferably, a minimal number of fluid jets 74 are employed, because the flow rate and pressure available through a long length of CT is limited by turbulent pressure losses. Thus, at any given flow rate a single jet will have a larger diameter and effective range than multiple jets. As illustrated, two opposed jets are employed in order to eliminate side thrust on drill head 28c. As noted above with respect to FIG. 6, fluid jets 74 may be offset from the rotation axis to provide rotational torque to downhole motor 26a. Scale deposits 80 are fragmented into debris 82 that can be transported away from the work area in the same manner as drill cuttings.

This disclosure has discussed the use of supercritical $CO_2$ for drilling. Alternative fluids, such as natural gas, may also be used in all of the embodiments discussed. Natural gas components such as nitrogen, methane, ethane, and propane may be added to carbon dioxide to increase the critical pressure for drilling in deeper formations. Natural gas may contain a high concentration of $CO_2$, and such gas may be compressed and used for jet drilling in place of pure carbon dioxide.

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A method for using at least one of a supercritical fluid and a dense gas to increase an efficiency of a drilling operation, comprising the steps of:
    (a) providing a material that exists in one of a supercritical phase state and a dense gas phase state at a temperature and a pressure associated with a drill site where the drilling operation is performed;
    (b) supplying the material to the drill site;
    (c) exposing the material that is being supplied to a temperature and a pressure that causes at least a portion of the material being supplied to change its phase state to one of a supercritical fluid and a dense gas;
    (d) ejecting a fluid stream of said material being supplied onto said drill site; and
    (e) performing said drilling operation, said material that is ejected increasing an efficiency of said drilling operation.

2. The method of claim 1, further comprising at least one of the steps of:
    (a) using said at least the portion of said material to provide cooling to a drilling apparatus;
    (b) using said at least the portion of said material to remove debris generated by said drilling operation from said drill site; and
    (c) using said at least the portion of said material to erode said drill site.

3. The method of claim 1, further comprising the step of providing a drilling apparatus that comprises a member adapted to apply at least one of a mechanical cutting action, a mechanical grinding action, and a mechanical shearing action to said drill site, further comprising the step of positioning said member of the drilling apparatus in contact with said drill site.

4. The method of claim 1, further comprising the steps of:
    (a) providing a fluid jet of said material; and
    (b) directing said fluid jet at the drill site.

5. The method of claim 1, further comprising the step of controlling at least one of said temperature and said pressure, to ensure that said at least the portion of said material in said fluid stream exists in said one of the supercritical phase state and the dense gas phase state.

6. The method of claim 1, wherein said material includes one of:
    (a) carbon dioxide;
    (b) natural gas;
    (c) a mixture of carbon dioxide and natural gas;
    (d) a mixture of carbon dioxide, natural gas and water;
    (e) a mixture of carbon dioxide and water;

(f) a mixture of carbon dioxide and at least one component of natural gas; and (g) a mixture of carbon dioxide, water, and at least one component of natural gas.

7. The method of claim 6, wherein the material contains a foaming agent.

8. The method of claim 1, wherein the step of performing the drilling operation comprises the step of removing scale deposits from a surface of said drill site.

9. The method of claim 1, further comprising the step of forming an opening in said drill site.

10. The method of claim 1, wherein the drill site comprises a plurality of pores, and the step of ejecting said fluid stream of the material comprises the step of causing at least a portion of said material existing in one of a supercritical phase state and a dense gas phase state to penetrate into said pores.

11. The method of claim 10, wherein the drill site comprises one of rock and concrete.

12. The method of claim 1, wherein the drill site comprises a geological formation.

13. The method of claim 12, wherein the geological formation is at a temperature of at least 31° C.

14. The method of claim 12, wherein the geological formation is associated with at least one of a petroleum resource, a natural gas resource, and a geothermal resource.

15. The method of claim 12, wherein the drill site includes an existing well for the extraction of at least one of a petroleum resource, a natural gas resource, and a geothermal resource.

16. The method of claim 15, further comprising the step of providing a drill apparatus that comprises a coiled tube adapted to fit within the existing well.

17. The method of claim 16, wherein the coiled tube comprises a downhole motor and a drill head driven by the downhole motor, and wherein the step of performing the drilling operation comprises the step of energizing said downhole motor to cause the drill head to be driven.

18. The method of claim 17, wherein the downhole motor comprises one of a turbine motor, a jet rotor, a progressive cavity displacement motor, a rotary-percussive hammer, and a vane motor.

19. The method of claim 17, wherein the drill head comprises one of a jet erosion bit, a mechanical bit, and a jet-assisted mechanical bit.

20. The method of claim 17, wherein the step of energizing the downhole motor comprises the step of causing said material to flow through said coiled tube and through said downhole motor.

21. The method of claim 17, further comprising the step of providing a second material that is a fluid, and wherein the step of energizing the downhole motor comprises the step of causing said second material to flow through said coiled tube and through said downhole motor.

22. The method of claim 15, wherein the existing well comprises a surface choke manifold, and further comprising the step of using the surface choke manifold to control said pressure to ensure that at least the portion of said material in said fluid stream exists in said one of the supercritical phase state and the dense gas phase state.

23. The method of claim 15, further comprising the steps of:
(a) providing a drilling mud; and
(b) filling the existing well with the drilling mud to control said pressure, to ensure that at least a portion of said material in said fluid stream exists in said one of the supercritical phase state and the dense gas phase state.

24. The method of claim 15, wherein the existing well comprises a surface choke manifold, further comprising the steps of:
(a) providing a source of drilling mud; and
(b) controlling the pressure to ensure that at least a portion of said material in said fluid stream exists in said one of the supercritical phase state and the dense gas phase state by carrying out at least one of the steps of:
(i) using the surface choke manifold to control the pressure; and
(ii) filling the existing well with drilling mud to control the pressure.

25. The method of claim 24, wherein the step of controlling the pressure comprises the step of causing said pressure to exceed 5 MPa.

26. The method of claim 24, wherein the step of controlling said pressure comprises the step of causing said associated pressure to exceed 7.4 MPa.

27. The method of claim 15, further comprising the steps of:
(a) providing a material recovery vessel in fluid communication with said existing well; and
(b) collecting said material after performing said drilling operation, so that said material can be reused.

28. A method for using at least one of a supercritical fluid and a dense gas to perform maintenance within an existing borehole formed by a drilling apparatus within a substrate of a geological formation, comprising the steps of:
(a) providing a material that exists in one of a supercritical phase state and a dense gas phase state at a temperature and a pressure within the existing borehole;
(b) ejecting a fluid stream of said material, said temperature and pressure causing at least a portion of said material in said fluid stream to exist in one of a supercritical phase state and a dense gas phase state; and
(c) performing the maintenance in the existing borehole with said at least the portion of the material.

29. The method of claim 28, wherein the step of performing the maintenance comprises at least one of the steps of:
(a) removing scale from within said existing borehole; and
(b) drilling an additional borehole, said additional borehole being in fluid communication with the existing borehole.

30. The method of claim 29, wherein the step of drilling an additional borehole comprises the step of drilling a lateral drainage well.

31. The method of claim 28, wherein the existing borehole comprises surface equipment, and the drilling apparatus comprises a coiled tube adapted to enter the existing borehole through the surface equipment, further comprising the steps of:
(a) passing said coiled tube through said surface equipment; and
(b) advancing said coiled tube into said existing borehole until a desired location is reached to perform the maintenance.

32. The method of claim 31, further comprising the step of:
(a) providing a downhole motor and a drill head adapted to be driven by said downhole motor, said drill head being disposed at a distal end of the coiled tube; and
(b) energizing said downhole motor to drive said drill head.

33. The method of claim 32, wherein the downhole motor comprises one of a turbine motor, a jet rotor, a progressive cavity displacement motor, a vane motor, and a rotary percussive hammer.

34. The method of claim 32, wherein the drill head comprises a jet erosion bit through which the fluid stream of the material is ejected, further comprising the step of positioning said jet erosion bit adjacent to said substrate, such that said fluid stream impacts said substrate, thereby causing said substrate to erode.

35. The method of claim 32, wherein the drill head comprises a mechanical bit adapted to apply at least one of a cutting action, a grinding action, and a shearing action to said substrate, further comprising the steps of:
 (a) contacting said substrate with the mechanical bit; and
 (b) using the material to carryout at least one of the steps of:
  (i) cooling said drill head; and
  (ii) removing debris from an area of the substrate adjacent to said drill head.

36. The method of claim 32, wherein the drill head comprises a jet assisted mechanical bit that is adapted to apply at least one of a cutting action, a grinding action, a shearing action and a jet eroding action to said substrate, further comprising the step of causing the jet assisted mechanical bit to contact said substrate; and wherein the step of ejecting said fluid stream comprises at least one of the steps of:
 (a) cooling said drill head;
 (b) removing debris from the area of the substrate adjacent to said drill head; and
 (c) eroding said substrate.

37. The method of claim 32, wherein the step of energizing the downhole motor comprises the step of causing said material to flow through said coiled tube and through said downhole motor.

38. The method of claim 32, further comprising the step of providing a second material that is a fluid; wherein the step of energizing the downhole motor comprises the step of causing said second material to flow through said coiled tube and through said downhole motor.

39. The method of claim 31, wherein the surface equipment comprises a surface choke manifold, further comprising the step of using the surface choke manifold to control the pressure so as to ensure that at least the portion of said material in said fluid stream exists in said one of the supercritical phase state and the dense gas phase state.

40. The method of claim 31, further comprising the steps of:
 (a) providing a source of drilling mud; and
 (b) filling the existing borehole with drilling mud to control the pressure to ensure that at least the portion of the material in said fluid stream exists in said one of the supercritical phase state and the dense gas phase state.

41. The method of claim 31, surface equipment includes a surface choke manifold, further comprising the steps of:
 (a) providing drilling mud; and
 (b) controlling the pressure to ensure that at least the portion of the material in said fluid stream exists in said one of the supercritical phase state and the dense gas phase state by carrying out at least one of the steps of:
  (i) using the surface choke manifold to control the pressure; and
  (ii) filling the existing borehole with drilling mud to control the pressure.

42. The method of claim 41, wherein the step of controlling the pressure further comprises the step of causing said pressure to exceed 5 MPa.

43. The method of claim 41, wherein the step of controlling said pressure comprises the step of causing said pressure to exceed 7.4 MPa.

44. The method of claim 28, wherein the material includes one of carbon dioxide, methane, natural gas, a mixture of carbon dioxide and methane, and a mixture of carbon dioxide and natural gas.

45. The method of claim 28, wherein the substrate comprises a plurality of pores, and the step of ejecting said fluid stream of said material comprises the step of causing at least the portion of the material existing in said one of the supercritical phase state and the dense gas phase state to penetrate into said pores.

46. The method of claim 28, further comprising the steps of:
 (a) providing a storage vessel for spent material, said storage vessel being in fluid communication with said substrate; and
 (b) collecting said material after it is used for the step of performing maintenance, so that said material can be reused.

47. The method of claim 28, further comprising the step of venting said material to the atmosphere after the material is used for performing maintenance.

48. A system for using one of a supercritical fluid and a dense gas to perform maintenance related to an existing borehole within a geological formation, comprising:
 (a) a supply source for a material that exists in one of a supercritical phase state and a dense gas phase state at a temperature and a pressure found within the existing borehole;
 (b) a drillstring having a distal end and a proximal end, said distal end being in fluid communication with said supply source, a tool defining a fluid outlet being mounted on the proximal end, said drillstring defining a fluid path from said supply source to said fluid outlet; and
 (c) means for controlling at least one of a temperature and a pressure at said fluid outlet, so that the material supplied through the fluid outlet exists in at least one of a supercritical phase and the dense gas phase, the material being employed to perform maintenance in the existing borehole.

49. The system of claim 48, wherein the drillstring further comprises a coiled tube.

50. The system of claim 48, wherein said drillstring further comprises a downhole motor, said downhole motor being disposed within said fluid path.

51. The system of claim 50, wherein said downhole motor comprises one of a turbine motor, a jet rotor, a progressive cavity displacement motor, a rotary percussive hammer, and a vane motor.

52. The system of claim 48, wherein the tool comprises one of a jet erosion bit, a jet assisted mechanical bit, and a mechanical bit.

53. The system of claim 48, wherein the tool comprises a jet erosion bit with a non rotating gage collar.

54. The system of claim 48, wherein the material includes one of:
 (a) carbon dioxide;
 (b) natural gas;
 (c) a mixture of carbon dioxide and natural gas;
 (d) a mixture of carbon dioxide, natural gas and water;
 (e) a mixture of carbon dioxide and water;
 (f) a mixture of carbon dioxide and at least one component of natural gas; and (g) a mixture of carbon dioxide, water, and at least one component of natural gas.

55. The system of claim 48, further comprising:

(a) a supply source of a second material that is a fluid;

(b) a second fluid path within said drillstring, said second fluid path being in fluid communication with said supply source of said second material at said distal end of said drillstring; and (c) a downhole motor disposed within said second fluid path, said downhole motor being drivingly connected to said tool and actuated by a flow of the second material through the second fluid path.

56. The system of claim 55, wherein said second material comprises one of drilling mud, water, and brine.

57. The system of claim 48, further including a storage vessel for spent material, said storage vessel being in fluid communication with said fluid outlet to enable spent material to be collected for reuse.

58. The system of claim 48, wherein said means comprises a choke manifold, said choke manifold being disposed at a distal end of said borehole, in fluid communication with said fluid path, and adapted to control said pressure within said borehole.

59. The system of claim 48, wherein said tool further comprises a plurality of radially oriented fluid outlets, each adapted to direct ajet of fluid toward a wall of said borehole, to remove scale from said wall.

60. The system of claim 59, wherein said plurality of radially oriented fluid outlets are disposed relative to one another so as to substantially eliminate side thrust on said tool.

61. The system of claim 59, wherein said plurality of radially oriented fluid outlets are offset from an axis of rotation of said tool, to provide rotational torque to said tool.

62. A system for using one of a supercritical fluid and a dense gas to perform maintenance related to an existing borehole within a geological formation, comprising:

(a) a supply source for a material that exists in one of a supercritical phase state and a dense gas phase state at a temperature and a pressure found within the existing borehole;

(b) a drillstring having a distal end and a proximal end, said distal end being in fluid communication with said supply source;

(c) a downhole motor in fluid communication with said drillstring, such that a fluid moving through said drillstring into said downhole motor drives said downhole motor;

(d) a tool defining a fluid outlet mounted on the proximal end of said drillstring, such that said tool is in fluid communication with said drillstring, said tool being drivingly rotated by said downhole motor; and (e) means for controlling at least one of a temperature and a pressure at said fluid outlet, so that the material supplied through the fluid outlet exists in at least one of the supercritical phase and the dense gas phase, the material being employed to perform maintenance in the existing borehole.

63. The system of claim 62, wherein said means comprises a choke manifold, said choke manifold being disposed at a distal end of said borehole, in fluid communication with said fluid path, and adapted to control said pressure within said borehole.

64. The system of claim 62, wherein said means comprises a drilling mud supply source, said drilling mud supply source being in fluid communication with said fluid path, and adapted to control said pressure within said borehole by providing drilling mud to form a mud cap within said borehole.

65. The system of claim 62, wherein said tool further comprises a plurality of radially oriented fluid outlets, each adapted to direct a jet of fluid toward a wall of said borehole, to remove scale from said wall.

66. The system of claim 65, wherein said plurality of radially oriented fluid outlets are disposed relative to one another so as to substantially eliminate side thrust on said tool.

67. The system of claim 65, wherein said plurality of radially oriented fluid outlets are offset from an axis of rotation of said tool to provide rotational torque to said tool.

* * * * *